United States Patent
Kotani et al.

(10) Patent No.: US 12,299,249 B2
(45) Date of Patent: May 13, 2025

(54) SENSOR BOARD AND DISPLAY DEVICE

(71) Applicant: Wacom Co., Ltd., Saitama (JP)

(72) Inventors: Yoshihiro Kotani, Saitama (JP);
Yutaka Nomura, Saitama (JP); Kyohei Ono, Saitama (JP); Seiji Sakurai, Saitama (JP); Kei Nishino, Saitama (JP); Naoki Watanabe, Saitama (JP)

(73) Assignee: Wacom Co., Ltd., Saitama (JP)

( * ) Notice: Subject to any disclaimer, the term of this patent is extended or adjusted under 35 U.S.C. 154(b) by 0 days.

(21) Appl. No.: 18/362,816

(22) Filed: Jul. 31, 2023

(65) Prior Publication Data

US 2023/0376158 A1 Nov. 23, 2023

Related U.S. Application Data

(63) Continuation of application No. PCT/JP2021/003668, filed on Feb. 2, 2021.

(51) Int. Cl.
*G06F 3/046* (2006.01)
*G02F 1/1333* (2006.01)
*G06F 3/0354* (2013.01)

(52) U.S. Cl.
CPC .......... *G06F 3/046* (2013.01); *G02F 1/13338* (2013.01); *G06F 3/03545* (2013.01)

(58) Field of Classification Search
CPC .......... G02F 1/13338; G02F 1/133603; G06F 3/046; G06F 3/04184; H10K 59/131
See application file for complete search history.

(56) References Cited

U.S. PATENT DOCUMENTS

| | | | |
|---|---|---|---|
| 2007/0091613 A1 | 4/2007 | Lee et al. | |
| 2014/0176840 A1 | 6/2014 | Hashido | |
| 2015/0355758 A1* | 12/2015 | Zhang | G06F 3/0416 345/174 |
| 2016/0048247 A1* | 2/2016 | Han | G02F 1/13338 345/87 |
| 2020/0341567 A1* | 10/2020 | Lin | G02F 1/133308 |
| 2021/0018795 A1 | 1/2021 | Calayir et al. | |

FOREIGN PATENT DOCUMENTS

| | | |
|---|---|---|
| DE | 102013226897 A1 | 6/2014 |
| DE | 102014114128 A1 | 12/2015 |
| JP | 2002258770 A | 9/2002 |
| JP | 2014021964 A | 2/2014 |
| JP | 2016066598 A | 4/2016 |
| JP | 2019016631 A | 1/2019 |
| WO | WO 2021024618 A1 | 2/2021 |

OTHER PUBLICATIONS

International Search Report, mailed Apr. 13, 2021, for International Patent Application No. PCT/JP2021/003668. (4 pages).

* cited by examiner

Primary Examiner — Jessica M Merlin
(74) Attorney, Agent, or Firm — Seed IP Law Group LLP

(57) ABSTRACT

The present disclosure relates to a sensor board and a display device. The sensor board includes a light-emitting device array (106) in which light-emitting devices is two-dimensionally arranged and loop coils which, in operation, detects a position that has been indicated by an electronic pen, through electromagnetic induction generated with the electronic pen. Line conductors connected to the light-emitting devices of the light-emitting device array is partly used in common as coil conductors formed by the loop coils.

6 Claims, 9 Drawing Sheets

(COMPARATIVE EXAMPLE)     (EXAMPLE)

SENSOR BOARD AND DISPLAY DEVICE

TECHNICAL FIELD

The present disclosure relates to a sensor board and a display device.

BACKGROUND ART

In the technical field of display devices, a direct-lit backlight with a light-emitting device array arranged on a side of a rear surface of a display panel to constitute an area light source is conventionally known (see, for example, Patent Documents 1 to 3). An electronic circuit board on which a light-emitting device array is mounted may hereinafter be called a "light source board."

PRIOR ART DOCUMENT

Patent Documents

Patent Document 1: JP 2002-258770A
Patent Document 2: JP 2016-066598A
Patent Document 3: JP 2019-016631A

BRIEF SUMMARY

Technical Problem

In the meantime, position detection sensors may be integrated on the side of the rear surface of the display panel in order to apply a writing function to the above-described display device. Systems of this type of sensors include, for example, the electromagnetic resonance type of system (what is generally called the EMR type of system) that detects an alternating magnetic field which has been delivered from a position indicator, through a plurality of loop coils arrayed one- or two-dimensionally. An electronic circuit board with position detection sensors mounted thereon may hereinafter be called a "sensor board."

The above-described light source board and sensor board are each desirably arranged at a position closer to the display panel and to extend in parallel to the display panel, in order for them to each exhibit its own function (specifically, a light-emitting function or a detecting function). It is hence possible to adopt such a device configuration that both the boards are arranged parallel to and opposing each other. According to such an arrangement relation, however, a problem arises in that an electromagnetic interference is prone to occur between line conductors mounted on the light source board and coil conductors mounted on the sensor board. As a result, electromagnetic noise may mix in with the coil conductors, possibly leading to a reduction in detection accuracy and/or a malfunction of the sensor board.

With such a problem in view, the present disclosure has as objects thereof the provision of a sensor board and a display device which can suppress the occurrence of electromagnetic noise associated with an electromagnetic interference between conductors which an optical light source board and a sensor board have respectively.

Technical Solution

A sensor board in a first embodiment includes a light-emitting device array in which a plurality of light-emitting devices is two-dimensionally arranged and a plurality of loop coils which, in operation, detect a position that has been indicated by an electronic pen of an electromagnetic resonance type, through electromagnetic induction generated with the electronic pen. A plurality of line conductors connected to the plurality of light-emitting devices of the light-emitting device array is partly used in common as coil conductors formed by the plurality of loop coils.

A display device in a second embodiment includes a light source board in which a plurality of light-emitting devices is two-dimensionally arranged and a sensor board in which a plurality of loop coils are formed and arranged extending in a first direction and a second direction intersecting the first direction, wherein the sensor board, in operation, detects a two-dimensional position that has been indicated by an electronic pen, through electromagnetic induction generated between the plurality of loop coils and the electronic pen. The light source board and the sensor board are arranged opposite to each other in a parallel relation maintained therebetween. On the light source board, a plurality of line conductors each connected to a respective one of the plurality of light-emitting devices is routed along a third direction inclined with respect to both the first direction and the second direction.

Advantageous Effect

According to the present disclosure, it is possible to suppress the occurrence of electromagnetic noise associated with electromagnetic interference between conductors of a light source board and a sensor board respectively.

MODES FOR CARRYING OUT THE DISCLOSURE

With reference to the accompanying drawings, a description will hereinafter be made with regard to embodiments of the present disclosure. To facilitate the understanding of the description, identical elements in the individual figures are identified by the same reference symbols to as much an extent as possible, and their repeated descriptions are omitted.

[Overall Configuration]

Figure 1:
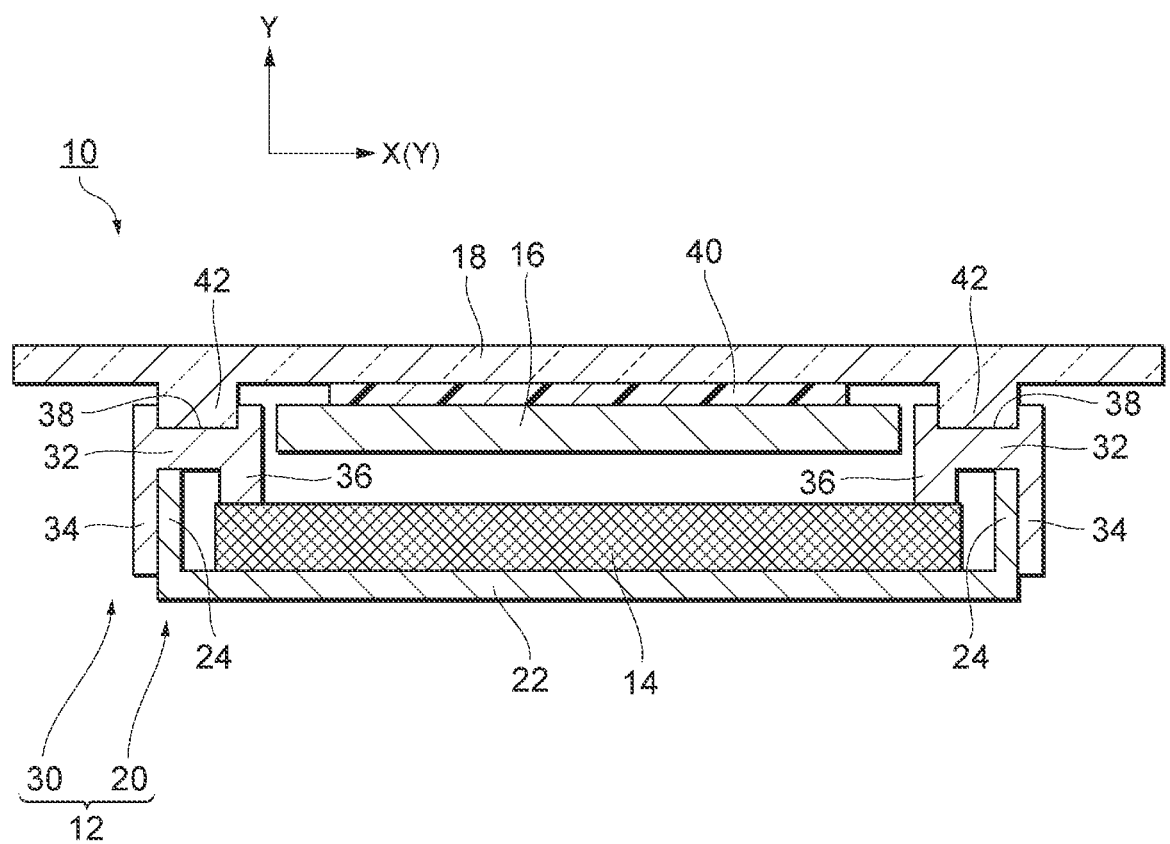
FIG. 1 is a cross-sectional view of a display device common to individual embodiments of the present disclosure.

FIG. 1 is a cross-sectional view of a display device 10 common to the individual embodiments of the present disclosure. Here, the display device 10 is assumed to be assembled using a semifinished product without mounting of a background module, that is, called an "open cell" as commonly named. Specifically, the display device 10 is configured including a casing 12, a board group 14, a liquid crystal panel 16, and a transparent protective plate 18. The casing 12 is constructed by a combination of a back surface cover 20 of a low parallelepiped shape with a support frame 30 of a substantially H-shape in cross-section.

The back surface cover 20 upwardly opens, and accommodates the board group 14 while it is kept in face-to-face contact with a bottom portion 22. The support frame 30 includes a picture-frame-shaped frame portion 32, a first protruding portion 34 that extends downwardly from an outer side of the frame portion 32, and a second protruding portion 36 that extends downwardly from an inner side of the frame portion 32. The first protruding portion 34 is configured to be engageable with a side portion 24 of the back surface cover 20. The second protruding portion 36 is configured to enable fixing of the board group 14 by pressing it from above.

The board group 14 is formed of a plurality of boards stacked together, the boards exhibiting at least a light-emitting function and a pen-detecting function. The term "light-emitting function" means a function to emit illumination light (what is generally called backlight) from a back surface to a front surface of the liquid crystal panel 16. The term "pen-detecting function" means a function to detect a position indicated by an electronic pen of the EMR system.

The transparent protective plate 18 is a plate-shaped member which has high light transmittance and protects a display surface of the liquid crystal panel 16, and is formed, for example, from glass or the like. To a back surface of the transparent protective plate 18, the liquid crystal panel 16 is bonded via an optical adhesive layer 40. Accordingly, the transparent protective plate 18 fixes the liquid crystal panels 16 via the display surface, whereby the liquid crystal panel 16 is supported from above. It is to be noted that, as the material of the optical adhesive layer 40, an optical clear adhesive (OCA) sheet or an optical clear resin (OCR) is used, for example.

Further, on the back surface of the transparent protective plate 18, a plurality of projecting portions 42 are formed at positions outside a fixed portion for the liquid crystal panel 16. The support frame 30 fixes and supports the transparent protective plate 18 with recessed portions 38 and the projecting portions 42 kept in engagement with each other. In this case, the support frame 30 and the liquid crystal panel 16 are in a positional relation that they do not overlap as seen in a plan view. With regard to a reason for this, a description will hereinafter be made.

It is also possible to adopt, for example, a structure in which the support frame 30 vertically extends inwardly from the second protruding portion 36 and locally supports the liquid crystal panel 16 from below. If a user happens to downwardly press the transparent protective plate 18 during use of the display device 10, however, a non-display surface of the liquid crystal panel 16 may come into contact with the support frame 30, and the liquid crystal panel 16 may thereby warp at a peripheral edge portion thereof. This leads to a state in which a light shielding function by a liquid crystal can no longer be exhibited locally, so that illumination light emitted from the board group 14 may leak out through the peripheral edge portion of the liquid crystal panel 16. As a result, the display quality of the display device 10 is lowered.

The display device 10 of FIG. 1 therefore has the board group 14, the liquid crystal panel 16 that is arranged directly above the board group 14 and has the display surface, the transparent protective plate 18 fixing the liquid crystal panel 16 via the display surface and hence supporting the liquid crystal panel 16 from above, and the support frame 30 supporting the transparent protective plate 18, and also includes the casing 12 with the board group 14 accommodated therein. Further, the support frame 30 and the liquid crystal panel 16 are disposed such that they do not overlap as seen in a plan view.

By a configuration as described above, the non-display surface of the liquid crystal panel 16 can avoid an interference with the support frame 30 even if the transparent protective plate 18 is downwardly pressed, thereby enabling suppression of leakage of illumination light caused by warping of the liquid crystal panel 16.

First Embodiment

With reference to FIG. 2 through FIG. 5, a description will next be made with regard to a board group 14A integrated in the display device 10 in the first embodiment of the present disclosure.

<Configuration>

Figure 2:
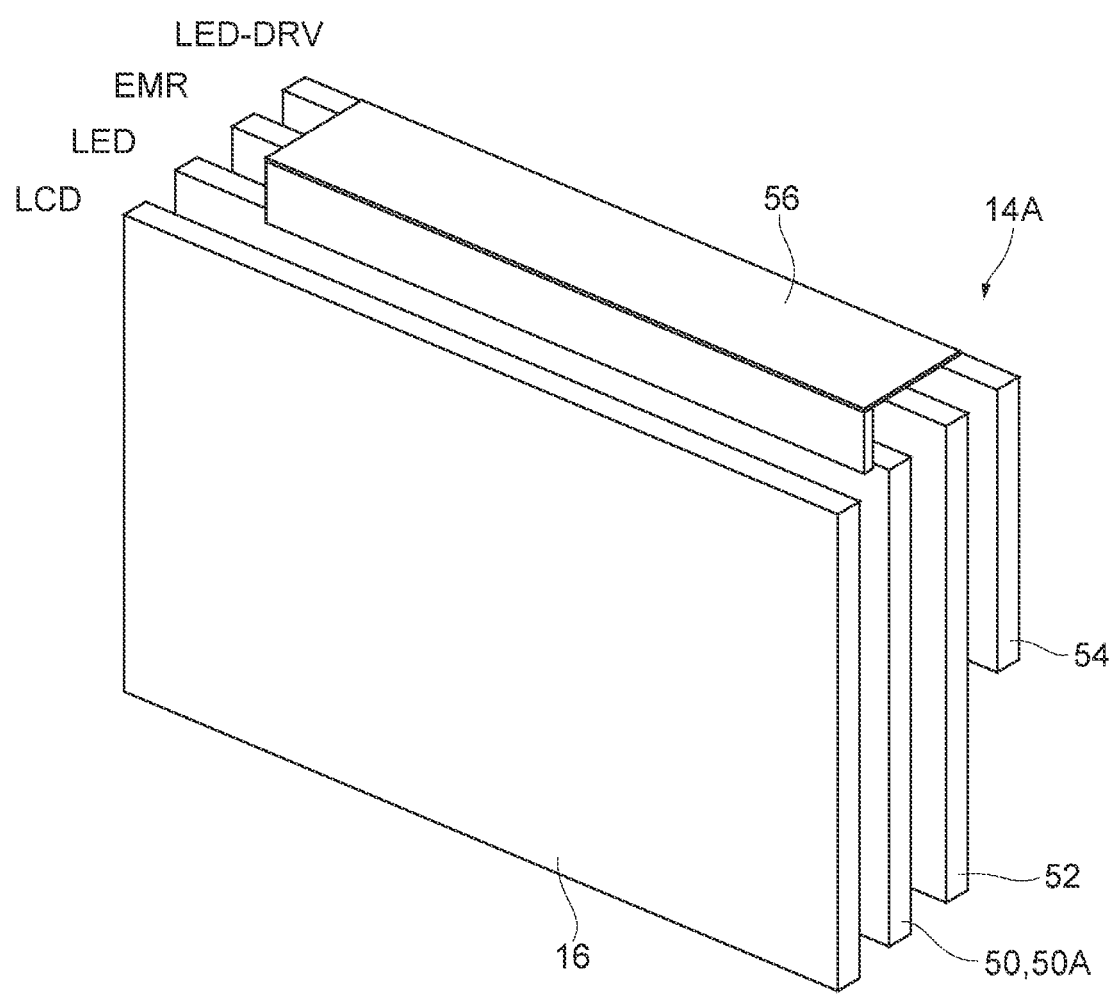
FIG. 2 is an exploded perspective view illustrating part of a display device in a first embodiment of the present disclosure.

FIG. 2 is an exploded perspective view illustrating part of the display device 10 in the first embodiment of the present disclosure. In more detail, FIG. 2 schematically illustrates a stacked relation between the board group 14A and the liquid crystal panel 16 in the first embodiment of the present disclosure. The board group 14A is constructed by a light source board 50, a sensor board 52, and a drive board 54 being stacked in an order from the liquid crystal panel 16. The drive board 54 is connected to the light source board 50 via a flexible printed board (hereinafter, an "FPC 56"), and performs drive control of a light-emitting diode (LED) array 84 (see FIG. 4) to be mentioned subsequently herein.

Figure 3:
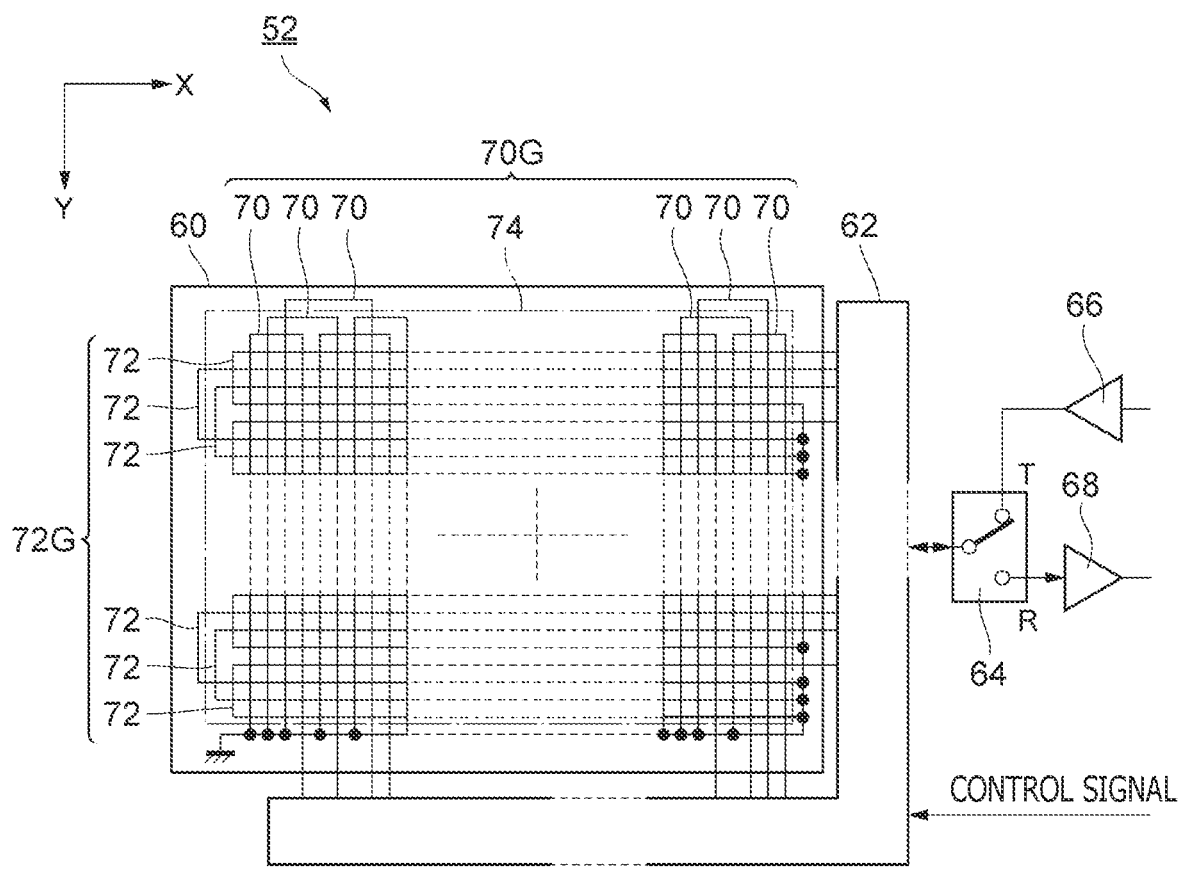
FIG. 3 is a diagram illustrating an example of a circuit configuration of a sensor board in FIG. 2.

FIG. 3 is a diagram illustrating an example of a circuit configuration of the sensor board 52 in FIG. 2. The sensor board 52 detects a two-dimensional position which has been indicated by the electronic pen, through electromagnetic induction generated between loop coils 70 and 72 and the electronic pen. Specifically, a variety of electronic parts and components, including a sensor section 60, a selection circuit 62, a switch 64, a transmission amplifier 66, and a reception amplifier 68, are disposed on a front surface or a rear surface of the sensor board 52.

The sensor section 60 is configured including a first loop coil group 70G and a second loop coil group 72G. The first loop coil group 70G and the second loop coil group 72G are arranged to intersect each other and form a two-dimensional lattice. A rectangular detection area 74 is therefore formed to indicate two-dimensional positions on XY coordinates.

The first loop coil group 70G is an assembly of coil conductors formed from N (N≥2) of the loop coils 70 that are arranged side by side in an X direction and extend in a Y direction. Each loop coil 70 has an elongated rectangular shape having a substantially constant width irrespective of positions in the Y direction. Each loop coil 70 is connected on a side of one end thereof to the selection circuit 62, and is connected on a side of the other end thereof to a reference potential (for example, a ground potential).

The second loop coil group 72G is an assembly of coil conductors formed from M (M≥2) of the loop coils 72 that are arranged side by side in the Y direction and extend in the X direction. Similarly to the loop coils 70, each loop coil 72 has an elongated rectangular shape having a substantially constant width irrespective of positions in the X direction. Each loop coil 72 is connected on a side of one end thereof to the selection circuit 62, and is connected on a side of the other end thereof to the reference potential (for example, the ground potential).

The selection circuit 62 changes over a connection destination between the sensor section 60 according to a control signal from an unillustrated controller. Therefore, one loop coil 70 in the first loop coil group 70G is selectively connected to the switch 64. As an alternative, one loop coil 72 in the second loop coil group 72G is selectively connected to the switch 64.

The switch 64 changes over the connection destination to either one of a terminal T or a terminal R according to a control signal from an unillustrated controller. If the connection destination is the terminal T, for example, the switch 64 outputs, to the sensor section 60, a transmission signal which has been supplied from the transmission amplifier 66. If the connection destination is the terminal R, on the other hand, the switch 64 outputs, to the reception amplifier 68, a reception signal which has been supplied from the sensor section 60.

Figure 4:
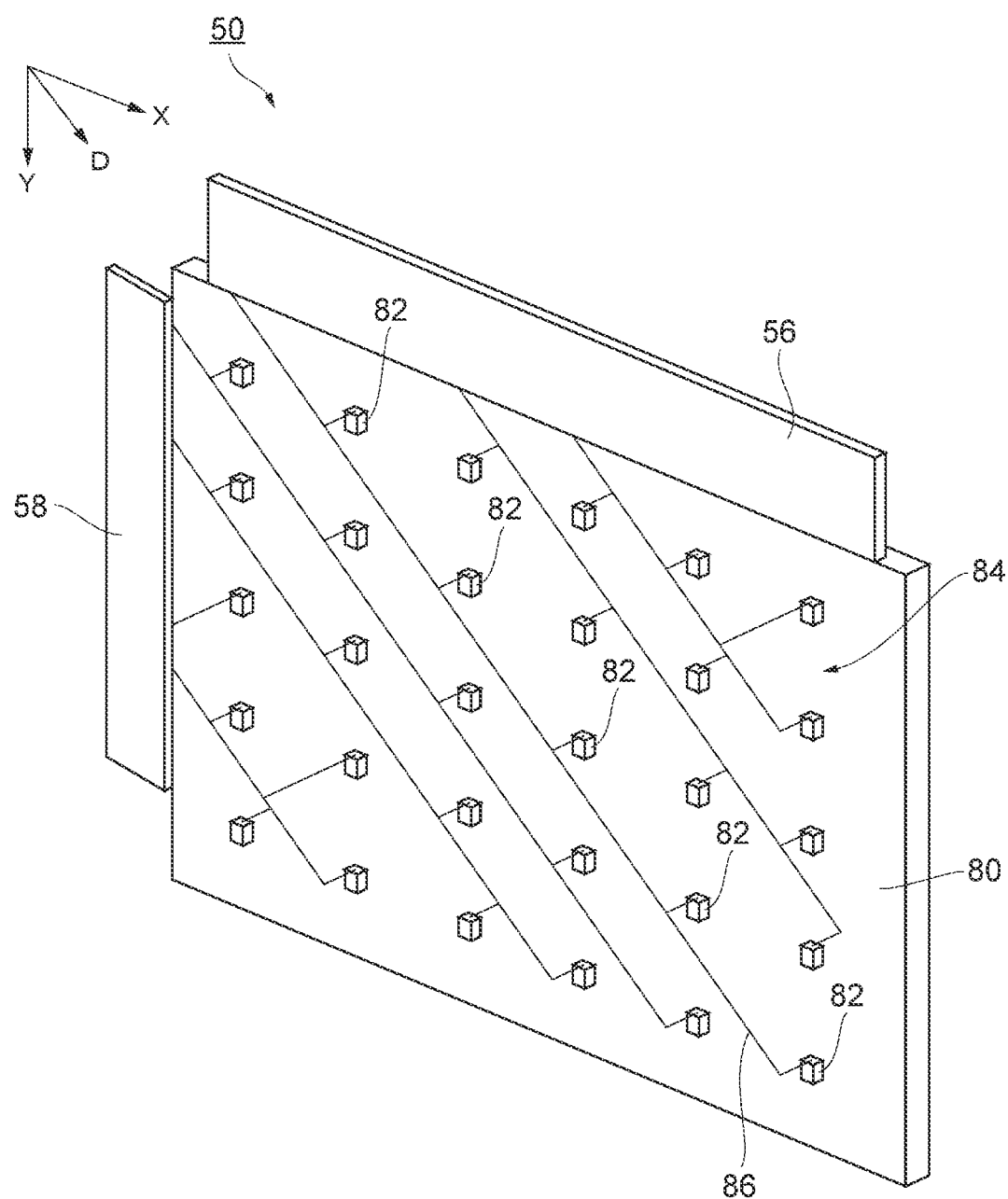
FIG. 4 is a view illustrating an example of a routing structure of a light source board in FIG. 2.

FIG. 4 is a view illustrating an example of a routing structure of the light source board 50 in FIG. 2. Disposed on a primary surface 80 of the light source board 50 is the LED array 84 that is an assembly of light-emitting diodes (hereinafter, LEDs 82). In the LED array 84, a plurality of LEDs 82 is arranged in a form of a lattice in two axes, one being in the X direction and the other in the Y direction. Each LED 82 is provided on an anode side and a cathode side thereof with line conductors routed to the FPC 56 or an FPC 58. In FIG. 4, only cathode lines are presented for the sake of illustration convenience.

A plurality of line conductors 86 extends in a D direction inclined with respect to both the X direction and the Y direction, and is disposed side by side at substantially equal intervals. To one line conductor 86, at least one LED 82 located in a vicinity of the line conductor 86 is connected. To the line conductor 86 labeled by the reference symbol, for example, five LEDs are connected. The inclination angle to the X direction may be, for example, preferably in a range of 15 to 75 degrees, with a range of 30 to 60 degrees being more preferred.

Advantageous Effect

Figure 5:
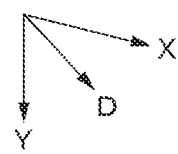
FIG. 5 depicts views illustrating an advantageous effect provided by the routing structure of FIG. 4.
Figure 5:
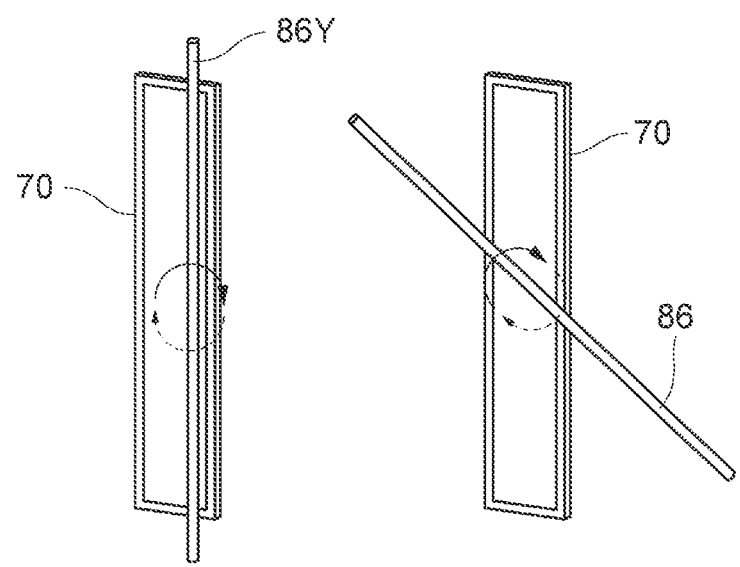

The board group 14A in the first embodiment of the present disclosure is configured as described above. With reference to FIG. 5, a description will next be made with regard to an advantageous effect provided by the routing structure of FIG. 4. A "Comparative Example" and an "Example" are illustrated on a left side of FIG. 5 and on a right side of FIG. 5, respectively.

In the "Comparative Example" of FIG. 5, a line conductor 86Y is assumed to be disposed along an array direction of the LED array 84 and in parallel to the Y direction. In the positional relation that the light source board 50 and the sensor board 52 are arranged opposite to each other in a parallel relation maintained therebetween, an electromagnetic interference may occur between the loop coil 70 and the line conductor 86Y. In particular, spatial conduction of electromagnetic noise is more prone to occur through stray capacitance, magnetic coupling, and the like, as routing sections which are in a parallel relation become longer. As a result, the electromagnetic noise mixes in with the loop coil 70, possibly leading to a reduction in detection accuracy and/or a malfunction of the sensor board 52.

In the "Example" of FIG. 5, on the other hand, the line conductor 86 extends inclined with respect to both the X direction and the Y direction. In this case, the loop coil 70 and the line conductor 86 are in "skew position" despite the light source board 50 and the sensor board 52 are arranged parallel to and opposing each other. Electromagnetic noise therefore hardly mixes in with the loop coil 70, through an electromagnetic wave cancellation effect occurring between the loop coil 70 and the line conductor 86Y. As a result, a reduction in detection accuracy and/or a malfunction of the sensor board 52 is suppressed.

As described above, the display device 10 in the first embodiment of the present disclosure includes the light source board 50 with the plurality of LEDs 82 (light-emitting devices) arranged two-dimensionally, and the sensor board 52 that detects a two-dimensional position which has been indicated by the electronic pen, through electromagnetic induction generated between the loop coils 70 and 72 arranged extending in the X direction (first direction) and/or the Y direction (second direction) intersecting the X direction. The light source board 50 and the sensor board 52 are arranged opposite to each other in the parallel relation maintained therebetween, and on the light source board 50, the line conductors 86 connected to the respective LEDs 82 are routed along the D direction (third direction) inclined with respect to both the X direction and the Y direction.

By a configuration as described above, the line conductors 86 and the loop coils 70 and 72 are prevented from extending substantially parallel to each other, despite the light source board 50 and the sensor board 52 are arranged opposite to each other in the parallel relation maintained therebetween. It is therefore possible to suppress the occurrence of electromagnetic noise associated with an electromagnetic interference between the conductors which the light source board 50 and the sensor board 52 have respectively.

Further, the loop coils may include the first loop coil group 70G that is arranged side by side in the X direction and extends in the Y direction and the second loop coil group 72G that is arranged side by side in the Y direction and extends in the X direction, and the first loop coil group 70G and the second loop coil group 72G may be arranged in such a manner as to intersect each other to form a two-dimensional lattice. It is therefore possible to prevent [1] the line conductors 86 and the loop coils 70 from extending parallel to each other and, at the same time, [2] the line conductors 86 and the loop coils 72 from extending parallel to each other.

<Modification>

Figure 6:
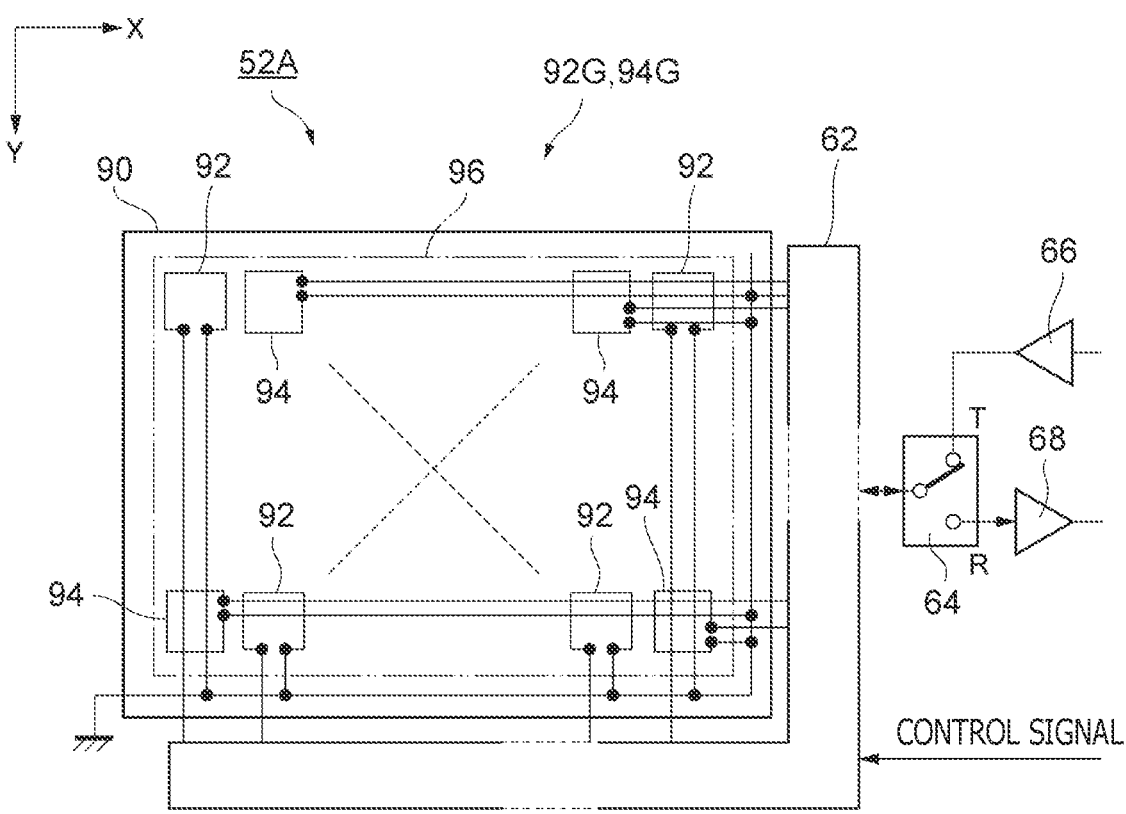
FIG. 6 is a circuit configuration diagram of a sensor board in a modification of the first embodiment of the present disclosure.

FIG. 6 is a circuit configuration diagram of a sensor board 52A in a modification of the first embodiment of the present disclosure. A variety of electronic parts and components, including a sensor section 90, the selection circuit 62, the switch 64, the transmission amplifier 66, and the reception amplifier 68, are disposed on a front surface or a rear surface of a sensor board 52A. In short, compared with the sensor board 52 in the first embodiment of the present disclosure, the sensor board 52A is different in the routing structure of the sensor section 60 (FIG. 3). The sensor section 90 is configured including a first loop coil group 92G and a second loop coil group 94G. A rectangular detection area 96 is therefore formed to indicate two-dimensional positions on XY coordinates.

The first loop coil group 92G is an assembly of coil conductors formed from N×M/2 (N, M≥2) of loop coils 92 that are arranged side by side in an X direction and extend in a Y direction. Each loop coil 92 has a tip portion bulged in a square shape. Each loop coil 92 is connected on a side of one end thereof to the selection circuit 62, and is connected on a side of the other end thereof to the reference potential (for example, the ground potential).

The second loop coil group 94G is an assembly of coil conductors formed from N×M/2 of the loop coils 94 that are arranged side by side in the Y direction and extend in the X direction. Similar to the loop coils 92, each loop coil 94 has a tip portion bulged in a square shape. Each loop coil 94 is connected on a side of one end thereof to the selection circuit 62, and is connected on a side of the other end thereof to the reference potential (for example, the ground potential).

The first loop coil group 92G and the second loop coil group 94G are arranged such that the M×N pieces of tip portions form a two-dimensional lattice. In the example of FIG. 6, the first loop coil group 92G and the second loop coil group 94G are complimentarily arranged in such a manner as to individually form a check pattern. It is to be noted that correlations (position, array, the number of pieces, etc.) between the loop coils 92 and 94 are not limited to the foregoing. For example, the sensor section 90 may also be configured using only the first loop coil group 92G, or only the second loop coil group 94G.

As described above, the loop coils 92 and 94 may have tip portions bulged in a block shape, and may be arranged such that the tip portions form a two-dimensional lattice. Similarly to the case of the first embodiment of the present disclosure, this configuration can also prevent [1] the line conductors 86 (FIG. 4) and the loop coils 92 from extending parallel to each other and, at the same time, [2] the line conductors 86 and the loop coils 94 from extending parallel to each other.

Second Embodiment

Figure 7:
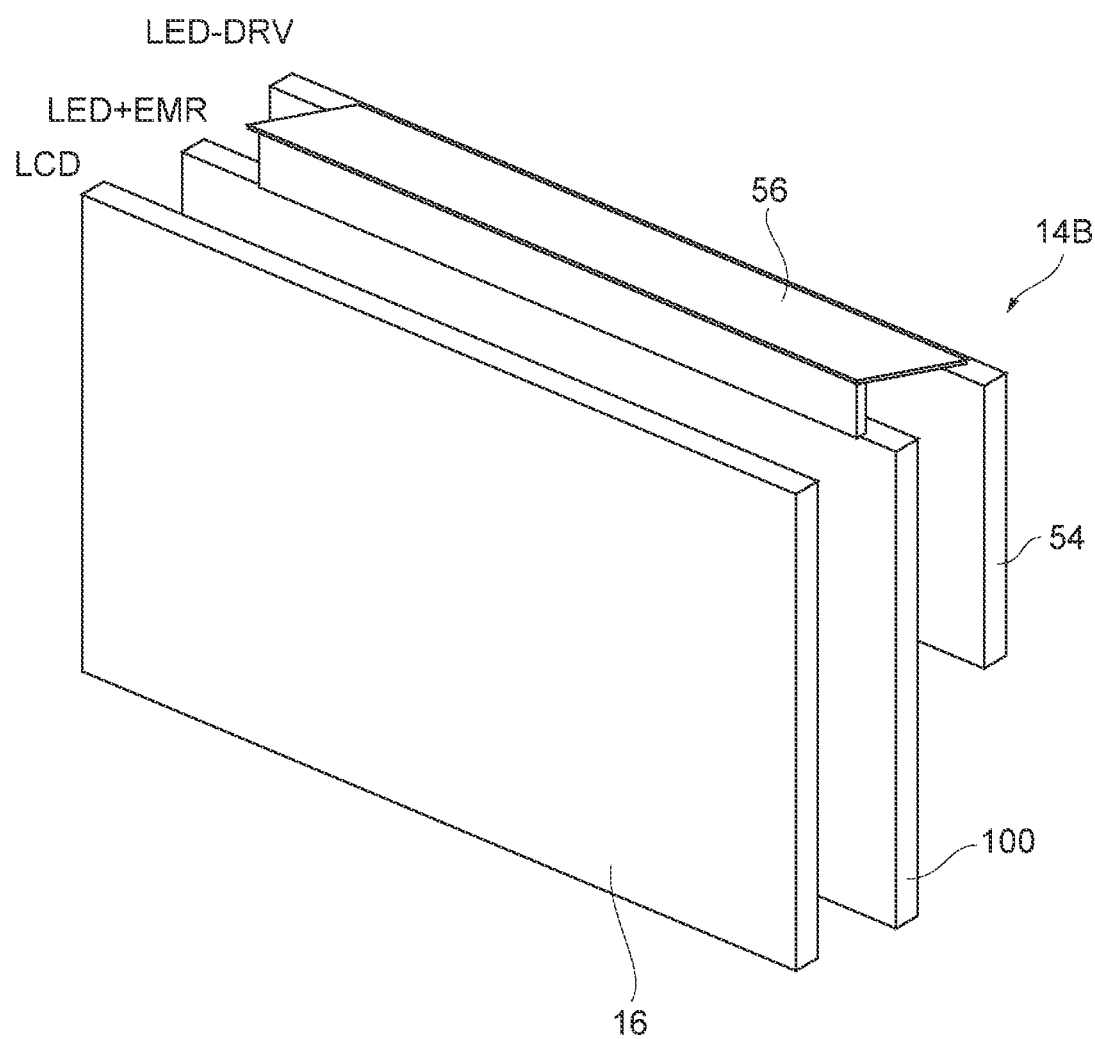
FIG. 7 is an exploded perspective view illustrating part of a display device in a second embodiment of the present disclosure.
Figure 8:
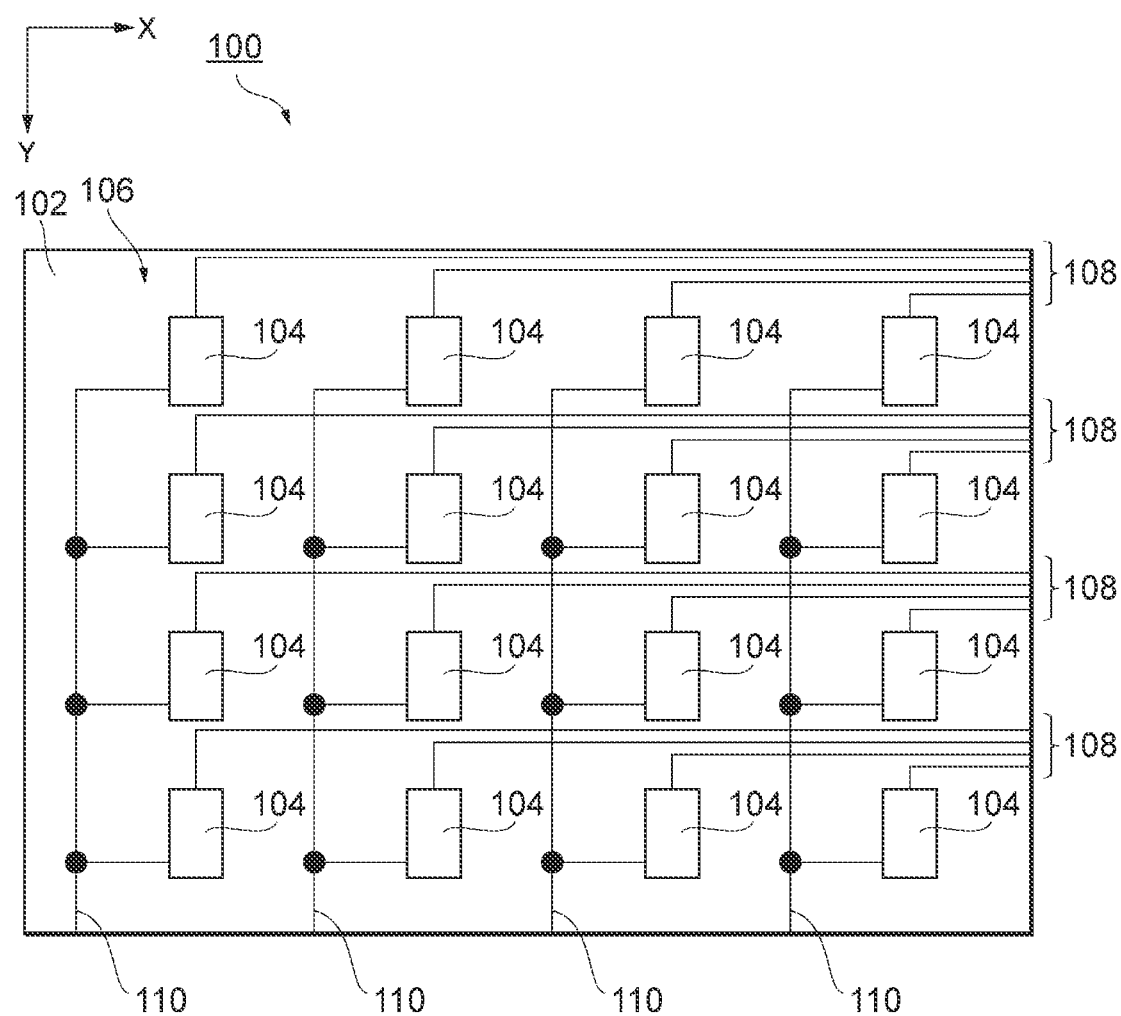
FIG. 8 is a first diagram illustrating a part of a routing configuration of a light source integrated sensor board in FIG. 7.
Figure 9:
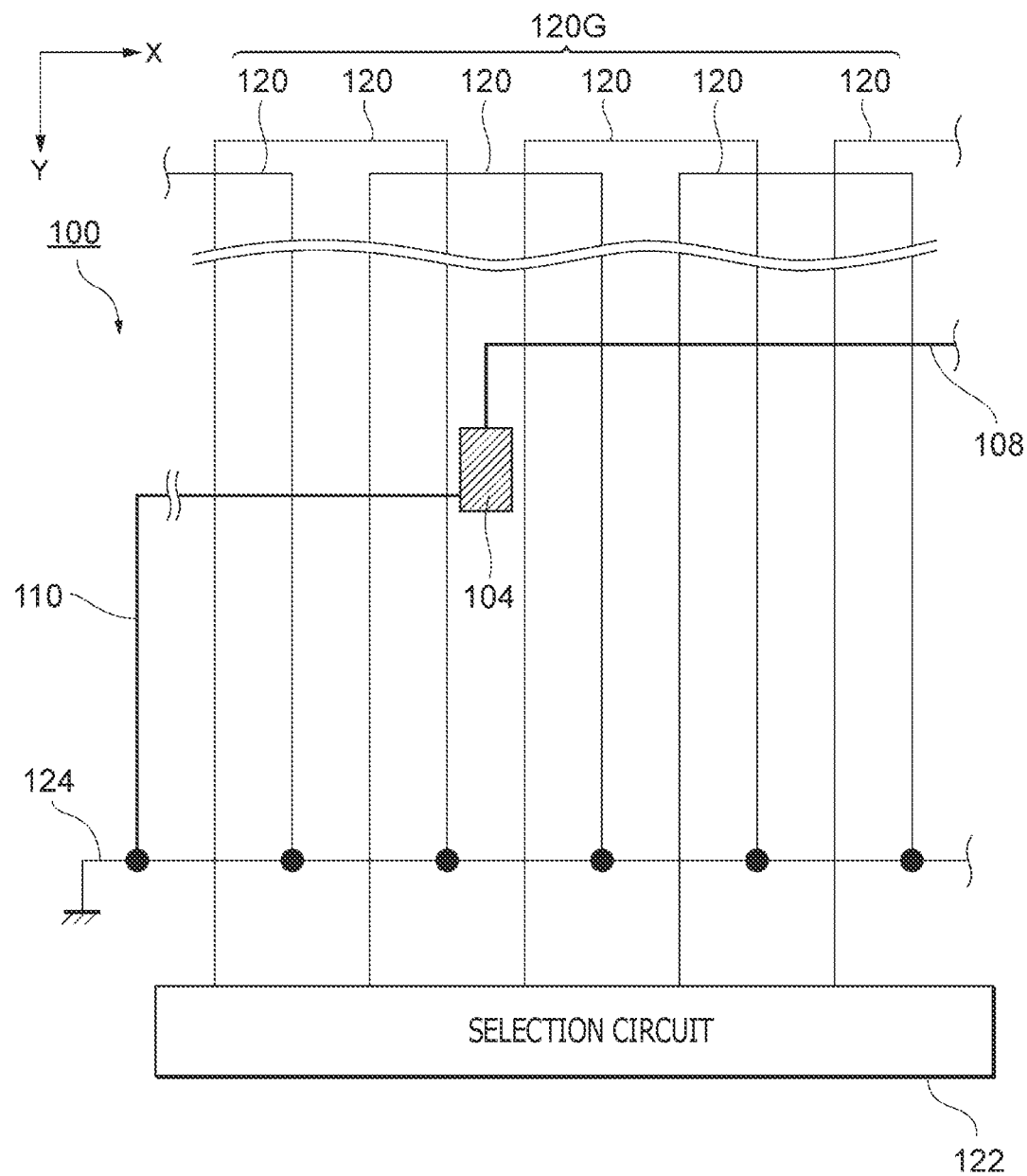
FIG. 9 is a second diagram illustrating a part of the routing configuration of the light source integrated sensor board in FIG. 7.

With reference to FIG. 7 to FIG. 9, a description will next be made with regard to a board group 14B integrated in a display device 10 in a second embodiment of the present disclosure.
<Configuration>
FIG. 7 is an exploded perspective view illustrating part of the display device 10 in the second embodiment of the present disclosure. In more detail, FIG. 7 schematically illustrates a stacked relation between the board group 14B and the liquid crystal panel 16 in the second embodiment of the present disclosure. The board group 14B is constructed by a light source integrated sensor board 100 and the drive board 54 being stacked in an order from the liquid crystal panel 16. The drive board 54 is connected to the light source integrated sensor board 100 via the FPC 56, and performs drive control of an LED array 106 (see FIG. 8) to be mentioned subsequently herein.

FIG. 8 is a first diagram illustrating an example of a routing structure of the light source integrated sensor board 100 in FIG. 7. FIG. 8 primarily extracts and illustrates part of the routing structure which relates to a light-emitting function. Disposed on a primary surface 102 of the light source integrated sensor board 100 is the LED array 106 that is an assembly of light-emitting diodes (hereinafter, LEDs 104). In the LED array 106, a plurality of LEDs 104 is arranged in a form of a lattice in two axes, one being in an X direction and the other in a Y direction. To anode sides of the individual LEDs 104, individual line conductors 108 are connected. To cathode sides of the individual LEDs 104, on the other hand, a common line conductor 110 is connected.

FIG. 9 is a second diagram illustrating another example of the routing structure of the light source integrated sensor board 100 in FIG. 7. FIG. 9 primarily extracts and illustrates part of the routing structure which relates to a detecting function. The light source integrated sensor board 100 detects a two-dimensional position which has been indicated by the electronic pen, through electromagnetic induction generated between loop coils 120 and the electronic pen. Specifically, the light source integrated sensor board 100 is configured including a first loop coil group 120G and a selection circuit 122 having a function similar to that of the first embodiment of the present disclosure (the selection circuit 62 in FIG. 3). It is to be noted that, although illustration is omitted, a variety of electronic parts and components, including a switch, a transmission amplifier, and a reception amplifier, are disposed on the light source integrated sensor board 100 as in the configuration of the first embodiment of the present disclosure (FIG. 3).

The first loop coil group 120G is an assembly of coil conductors formed from N (N≥2) pieces of loop coils 120 that are arranged side by side in an X direction and extend in a Y direction. Each loop coil 120 has an elongated rectangular shape having a substantially constant width irrespective of positions in the Y direction. Each loop coil 120 is connected on a side of one end thereof to the selection circuit 122, and is connected on a side of the other end thereof to a ground line 124.

The anode side of an LED 104 is connected to the drive board 54 (FIG. 7) via a line conductor 108. On the other hand, the cathode side of the LED 104 is connected to the ground line 124 via a line conductor 110. Although only the one LED 104 (FIG. 8) is illustrated in FIG. 9, similar routing is also applied to unillustrated other LEDs 104.

It is to be noted that, in FIG. 9, only the first loop coil group 120G for detecting indicated positions in the X direction is presented. It is however noted that, similar to the case of the first embodiment of the present disclosure (FIG. 3), a second loop coil group for directing indicated positions in the Y direction is also disposed in combination. As an alternative, the routing structure illustrated in FIG. 6 can also be adopted.

Advantageous Effect

As described above, the light source integrated sensor board 100, the light source integrated sensor board 100 includes the LED array 106 (light-emitting device array) with the LEDs 104 (light-emitting devices) arranged two-dimensionally, and the plurality of loop coils 120 for detecting a position which has been indicated by the electronic pen, through electromagnetic induction generated with the electronic pen of the electromagnetic induction system. The line conductors connected to the LED array 106 are partly used in common as coil conductors formed by the loop coils 120. For example, the line conductors 110 connected to the cathode sides of two or more LEDs 104 and the one ends of two or more loop coils 120 are connected to the common ground line 122.

By partly using the line conductors connected to the LED array 106 in common as coil conductors formed by the loop coils 120, as described above, it is no longer necessary to take into consideration the arrangement relation between a light source board and a sensor board disposed separately. It is therefore possible to suppress the occurrence of electromagnetic noise associated with an electromagnetic interference between the conductors which the light source board and the sensor board have respectively. In addition, the manufacturing cost and disposition space are reduced by the integration of the circuit boards.

[Modifications]

It is to be noted that the present disclosure is not limited to the above-described embodiments and modification, and can obviously be changed within a scope not departing from the gist of this disclosure. In other words, the individual elements may be combined as desired within a scope causing no technical contradiction.

In each embodiment described above, the description is made with regard to the configuration that the display device 10 in FIG. 1 has the "direct-lit" backlight, but the system of backlight is not limited to such a configuration. For example, an "edge-lit" backlight that light-emitting devices are disposed on a side of the display surface may be integrated in the display device.

In the first embodiment of the present disclosure described above, the description is made with regard to the case that the LEDs are disposed on the light source board 50 of FIG. 3, but the light-emitting devices are not limited to them. For example, the light-emitting devices may be organic LEDs (OLEDs), or laser diodes. In addition, this also applies similarly to the light-emitting devices in the second embodiment of the present disclosure (FIG. 8).

DESCRIPTION OF REFERENCE SYMBOLS

10: Display device
12: Casing
14, 14A, 14B: Board group
16: Liquid crystal panel
18: Transparent protective plate
30: Support frame
50: Light source board
52, 52A, 90: Sensor board
70G, 92G, 120G: First loop coil group
72G, 94G: Second loop coil group
82, 104: LED
100: Light source integrated sensor board (sensor board)

The invention claimed is:

1. A sensor board comprising:
a light-emitting device array in which a plurality of light-emitting devices is two-dimensionally arranged; and
a plurality of loop coils which, in operation, detect a position that has been indicated by an electronic pen of an electromagnetic resonance type, through electromagnetic induction generated with the electronic pen,
wherein a plurality of line conductors connected to the plurality of light-emitting devices of the light-emitting device array is partly used in common as coil conductors formed by the plurality of loop coils.

2. The sensor board according to claim 1, wherein the plurality of line conductors connected is to cathode sides of the plurality of light-emitting devices and one end of each of the loop coils is connected to a common ground line.

3. A display device further comprising:
a sensor board including:
a light-emitting device array in which a plurality of light-emitting devices is two-dimensionally arranged; and
a plurality of loop coils which, in operation, detect a position that has been indicated by an electronic pen of an electromagnetic resonance type, through electromagnetic induction generated with the electronic pen,
wherein a plurality of line conductors connected to the plurality of light-emitting devices of the light-emitting device array is partly used in common as coil conductors formed by the plurality of loop coils;
a liquid crystal panel that is arranged directly above the sensor board and has a display surface;
a transparent protective plate fixing the liquid crystal panel via the display surface,
wherein the liquid crystal panel is supported from above the liquid crystal panel; and
a casing having a support frame that supports the transparent protective plate and accommodates the sensor board therein,
wherein the support frame and the liquid crystal panel are disposed not to overlap each other as seen in a plan view.

4. A display device comprising:
a light source board in which a plurality of light-emitting devices is two-dimensionally arranged; and
a sensor board in which a plurality of loop coils are formed and arranged extending in a first direction and a second direction intersecting the first direction, wherein the sensor board, in operation, detects a two-dimensional position that has been indicated by an electronic pen, through electromagnetic induction generated between the plurality of loop coils and the electronic pen,
wherein the light source board and the sensor board are arranged opposite to each other in a parallel relation maintained therebetween, and
wherein, on the light source board, a plurality of line conductors each connected to a respective one of the plurality of light-emitting devices is routed along a third direction inclined with respect to both the first direction and the second direction.

5. The display device according to claim 4, wherein:
the plurality of loop coils includes a first loop coil group that is arranged side by side in the first direction and extends in the second direction and a second loop coil group that is arranged side by side in the second direction and extends in the first direction, and
the first loop coil group and the second loop coil group intersect each other and form a two-dimensional lattice.

6. The display device according to claim 4, further comprising:
a liquid crystal panel that is arranged directly above the light source board and has a display surface;
a transparent protective plate fixing the liquid crystal panel via the display surface,
wherein the liquid crystal panel is supported from above the liquid crystal panel; and
a casing having a support frame that supports the transparent protective plate and accommodates the light source board and the sensor board therein,
wherein the support frame and the liquid crystal panel are disposed not to overlap each other as seen in a plan view.

* * * * *